United States Patent
van der Linde (10) Patent No.: US 8,117,058 B2
(45) Date of Patent: *Feb. 14, 2012

(54) METHOD FOR DATA PROCESSING AND DISPLAY FOR DETECTING AND/OR PREDICTING POSSIBLE TRENDS

(76) Inventor: Leon van der Linde, Alicante (ES)

( * ) Notice: Subject to any disclaimer, the term of this patent is extended or adjusted under 35 U.S.C. 154(b) by 40 days.

This patent is subject to a terminal disclaimer.

(21) Appl. No.: 12/719,860

(22) Filed: Mar. 9, 2010

(65) Prior Publication Data

US 2010/0292981 A1 Nov. 18, 2010

Related U.S. Application Data

(63) Continuation-in-part of application No. 11/412,069, filed on Apr. 27, 2006, now Pat. No. 7,707,061.

(60) Provisional application No. 60/675,097, filed on Apr. 27, 2005, provisional application No. 61/175,007, filed on May 2, 2009.

(51) Int. Cl.
*G06Q 10/00* (2006.01)
*G06F 17/10* (2006.01)
*G06F 7/60* (2006.01)
*G06F 9/45* (2006.01)

(52) U.S. Cl. ............... 705/7.29; 705/1.1; 703/2; 703/22

(58) Field of Classification Search ............... 705/1.1, 705/7.29; 703/2, 22
See application file for complete search history.

(56) References Cited

U.S. PATENT DOCUMENTS

| | | | | |
|---|---|---|---|---|
| 5,528,516 A | * | 6/1996 | Yemini et al. | 702/181 |
| 5,661,668 A | * | 8/1997 | Yemini et al. | 702/186 |
| 6,088,676 A | * | 7/2000 | White, Jr. | 705/7.39 |
| 6,321,212 B1 | * | 11/2001 | Lange | 705/36 R |
| 6,415,268 B1 | * | 7/2002 | Korisch | 705/36 R |
| 6,868,367 B2 | * | 3/2005 | Yemini et al. | 702/183 |
| 2002/0165842 A1 | * | 11/2002 | Hellerstein et al. | 706/47 |
| 2003/0088458 A1 | * | 5/2003 | Afeyan et al. | 705/10 |
| 2003/0105703 A1 | * | 6/2003 | Palsky et al. | 705/36 |
| 2004/0093294 A1 | * | 5/2004 | Trevino | 705/36 |
| 2005/0210133 A1 | * | 9/2005 | Florissi et al. | 709/224 |
| 2005/0261953 A1 | * | 11/2005 | Malek et al. | 705/10 |
| 2008/0177670 A1 | * | 7/2008 | Reid | 705/36 R |

OTHER PUBLICATIONS

Heylighen, F (1999) "Collective Intelligence and its Implementation on the Web: Algorithms to develop a collective Mental map". Computational and Mathematical Organization Theory. Oct. 1999. 5:3: 253-280.*
Kawanishi, K (2004). "A closed-form solution on a level-dependent Markovian arrival process with queuing application." CALCOLO 41: 153-175.*

* cited by examiner

*Primary Examiner* — Shahid Merchant
*Assistant Examiner* — Joan Goodbody
(74) *Attorney, Agent, or Firm* — Christopher Wood; Premier Law Group, PLLC (57) ABSTRACT

A method for detecting trends based on outcomes generated by a first process, comprising the steps of: (a) determining all possible outcomes associated with the first process, wherein the first process is associated with a range of possible outcomes; (b) coding the possible outcomes to provide a plurality of separate groups, wherein each possible outcome is systematically allocated to one of the groups; (c) allocating an identifier to each of the groups; (d) monitoring the first process such that actual outcomes generated by the first process are mapped to an identifier in accordance with coding step (b); (e) providing a matrix made up of rows and columns; (f) allocating each identifier generated in step (d) to the matrix, and (g) repeating step (f) until a trend of duplicating identifiers becomes self-evident.

1 Claim, 5 Drawing Sheets

FIG. 5

METHOD FOR DATA PROCESSING AND DISPLAY FOR DETECTING AND/OR PREDICTING POSSIBLE TRENDS

CROSS-REFERENCE TO RELATED APPLICATIONS

This application is a continuation-in-part of U.S. patent application Ser. No. 11/412,069, which was filed on Apr. 27, 2006 now U.S. Pat. No. 7,707,061 and which is incorporated herein by reference in its entirety. This application also claims the benefit of priority from U.S. Provisional Patent Application Ser. No. 60/675,097, filed Apr. 27, 2005, and which is incorporated herein by reference in its entirety. This application also claims the benefit of priority from U.S. Provisional Patent Application Ser. No. 61/175,007 (filed May 2, 2009) and U.S. Nonprovisional patent application Ser. No. 12/435,345 (filed May 4, 2009); both of which (i.e., Ser. Nos. 61/175,007 and 12/435,345) are incorporated herein by reference in their entirety. This application also claims the benefit of priority from PCT/US09/42758 (filed May 4, 2009).

STATEMENT REGARDING FEDERALLY SPONSORED RESEARCH OR DEVELOPMENT

Not Applicable.

FIELD OF THE INVENTION

This invention relates to data processing and display for detecting and/or predicting possible trends.

BACKGROUND OF THE INVENTION

Human minds typically have difficulty in quickly processing and making sense of large quantities of numeric and nonnumeric data, particularly in real time. The task of detecting trends in real time to enable rapid rational decisions is often very difficult.

While there are numerous prior art software techniques for handling large volumes of data, such techniques often do not prove useful or meaningful in displaying information in an easy to understand manner to help discern trends to provide a basis for making rational decision to predict likely future outcomes.

Thus, a methodology solving the aforementioned problems is desired.

SUMMARY

A method for detecting trends based on outcomes generated by a first process, comprising the steps of: (a) determining all possible outcomes associated with the first process, wherein the first process is associated with a range of possible outcomes; (b) coding the possible outcomes to provide a plurality of separate groups, wherein each possible outcome is systematically allocated to one of the groups; (c) allocating an identifier to each of the groups; (d) monitoring in real time the first process such that actual outcomes generated by the first process are mapped to an identifier in accordance with coding step (b); (e) providing a matrix comprised of a plurality of cells arranged in rows and columns; (f) allocating each identifier generated in step (d) to the matrix and (g) repeating step (f) until a trend of duplicating identifiers becomes self-evident, wherein steps (a) through (g) are encoded into a computer software programmable language and run on a computer, wherein each identifier is allocated to the first row from left to right, and upon first duplication of identifier allocating the identifier to the 2nd row from left to right, and upon second duplication of the identifier allocating the identifier to the 3rd row from left to right; and upon third duplication of identifier allocating the identifier to the 4th row from left to right, and upon fourth duplication of identifier allocating the identifier to the 5th row and so on, wherein the number of columns in the matrix are sufficient to accommodate the number of identifiers of step (c), wherein the number of rows in the matrix are sufficient to accommodate the number of duplications occurring in the first process.

In one embodiment the first process is associated with a range of possible outcomes, more specifically a range of all possible first appearances outcomes within the study group and wherein step (f) is repeated until a trend of duplicate identifiers becomes self-evident as the fill up the Exeleon matrix with a structure which is as a function of (a) wherein the first process is associated with a range of possible outcomes, more specifically a range of all possible outcomes, defined as first appearances outcome only, within the study group.

DETAILED DESCRIPTION OF THE INVENTION

The invention is directed to a method for detecting and/or predicting possible trends in numeric or non-numeric data in real time or based on historic data.

The 5,4,3,3,2,2,2,1,1 matrix described in US patent publication 20060293912 is a function and a "fingerprint" identification of a data study with a sum total of 9 random variables $(x)_n=9$, with n a positive integer and a subset of any random set space with n, ($1 \leq n \geq \infty$) These random variables have however a further characteristic and that is that this sum total of n is just the sum total of the first-time-appearance-only characteristic of the $(x)_n$ random variables, abbreviated as $(x)_{nf}$, with nf also a positive integer and again a subset of n. ($1 \leq nf \geq \infty$).

On the same basis the length of the x axis of the Exeleon matrix, $\Sigma \cancel{E}(x)$, and the y-axis length of the Exeleon matrix, $\Sigma \cancel{E}(y)$, and the sum total cells of a Exeleon matrix $\Sigma \Omega \cancel{E}(x_y)$ are all functions of the sum total of the random variables which can possibly make a first time appearance only, per random data study=$\Sigma(x)_{nf}$, where f=first time appearance only.

The mathematical functions and calculations to establish the size and structure of the Exeleon matrix, where the size and the structure of the Exeleon matrix are all functions and derived from the sum total of possible outcomes defined as: "a first appearances outcome only", from a specific study of a study group or set of random variables of such a study. These functions and calculations are pertaining to "single input/output random variable display", as per the Exeleon Algorithm. Following these are the multiple input/output random variable display as per the Exeleon Algorithm, which is a multiple of the "single input/output random variable display", as per the Exeleon Algorithm, arranged in a mirror configuration.

The formulas and determinants for the Exeleon matrix using the Exeleon algorithm steps are as follows:
Therefore:

$$\Sigma \mathbb{E}(x) = \int \Sigma(x)_{nf}$$

$$\Sigma \Omega \mathbb{E}(x_y) \sim \Sigma \mathbb{E}(x)\phi^2 = \Sigma \mathbb{E}(x)\phi^2 - E_k = \int \Sigma \mathbb{E}(x)$$

$$\Sigma \mathbb{E}(y) = \int \Sigma \mathbb{E}(x)$$

Where:
$\Sigma(x)_{nf}$=the sum total of positive integers nf, and $(x)_{nf}$ is the sum total of all possible first-appearance-only of a random data set of a random study with,
nf $\subset \mathbb{E}$ and ($1 \leq nf \geq \infty$).
$\Sigma \mathbb{E}(x)$=the sum total of random first-time-appearances-only random variables, $(\Sigma(x)_{nf})$ filling up row R1 of the Exeleon matrix as per the Exeleon algorithmic procedure and this sum total is a function of $\Sigma(x)_{nf}$ of a random study.
Where:
$\Sigma \Omega \mathbb{E}(x_y)$=the sum total area of the Exeleon space, designated as total amount of cells of the Exeleon matrix displaying all the x and y values of such matrix as per Exeleon algorithmic procedure, which is a again a function of $\Sigma \mathbb{E}(x)$.
$\phi^2 = (1.618)^2$
$E_k$=Exeleon constant
$\Omega \mathbb{E}$=Exeleon space, which is a metaphorically random manifold, which manifests itself as a topographical landscape of hills and valleys forming channels portrayed in a two dimensional space area, mimicking the modus operandi of random event appearances in a higher dimension.
$(x_y)$=all random event appearances, either as random first-time-appearances-only appearances$(x)_{nf}$ and subsequent repeat appearances $(y)_n$ in a close random study.
Where:
$\Sigma \mathbb{E}(y)$=the sum total of random repeat only appearances $(y)_n$, filling up all the rows, except for row 1, (R1) of the Exeleon matrix as per the Exeleon Algorithmic procedure and a is a function of $\Sigma \mathbb{E}(x)$.
Where:
nf $\subset \mathbb{E}$: n is hereby an positive integer and a subset of Zahlen, which means numbers.
Exeleon matrix:
Example layout shown below:

Y-axis $\mathbb{E}(y)$=repeat appearance, of any single random occurrence as per Exeleon algorithmic procedures.
$\mathbb{E}(y)_n$=number of $\mathbb{E}(y)$-events.
$\Sigma \mathbb{E}(y)$=sum total of $\mathbb{E}(y)$-events in Exeleon matrix.
$\mathbb{E}(x)$=unique first-time-appearance-only, of any single random occurrence as per Exeleon algorithmic procedures.
$\mathbb{E}(x)_n$=number of $\mathbb{E}(x)$-events
$\Sigma \mathbb{E}(x)$=sum total of $\mathbb{E}(x)$-events in Exeleon matrix.

$\Delta T$=fill up of Exeleon matrix per sequential appearance of random events, therefore not a time increment but a random event occurrence increment.
$\Sigma \mathbb{E}(x)(\phi)^2$=Area of Exeleon virtual space Determining the Exeleon Matrix Values of (1) $\Sigma \mathbb{E}(x)$; (2) $\Sigma \Omega \mathbb{E}(x_y)$ and (3) $\Sigma \mathbb{E}(y)$ as a Functions of $\Sigma(x)_{nf}$ (1) $\Sigma \mathbb{E}(x)$:
The sum total of the first-time-appearances-only variables of "the random study", which will be introduced in Row 1 of the Exeleon matrix. (R1/C1 ... C9).

$$\Sigma \mathbb{E}(x) = \Sigma(x)_{nf}$$

$\Sigma(x)_{nf}$=the sum total of random events, which is possible to make a first-time-appearance-only in this "random study."
(2) $\Sigma \Omega \mathbb{E}(x_y)$:

$$\sim \sum \mathbb{E}(x)\varphi^2 = \sum \mathbb{E}(x)\varphi^2 - E_k$$
$$= \sum \mathbb{E}(x)(1.618)^2 - \left\{ \sum \mathbb{E}(x) - \left\{ (0.11803398874 \sum \mathbb{E}(x)) + \left( \sum \mathbb{E}(x)/2^2 - 1 \right) \right\} \right\}$$
$$= \text{the sum total amount of } (x) \text{ and } (y) \text{ cell values of the Exeleon matrix as a function of } \sum \mathbb{E}(x) \text{ of a "random study"}$$

(3) $\Sigma \mathbb{E}(y)$:=the sum total amount of (y) cell values (repeat performance only variables) of the Exeleon matrix as a function of $\Sigma \mathbb{E}(x)$ of a "random study".
$\Sigma \mathbb{E}(y)$=can be determined by another unique calculation namely,
$\Sigma \mathbb{E}(y) = \{(u)(p) - (y\text{-factor})\}$

| multiples | $\Sigma \mathbb{E}(x)$ | Unit(u) | Power(p) | unit*power | y-factor | $\Sigma \mathbb{E}(y)$ |
|---|---|---|---|---|---|---|
| 1 | 4 | 2 | 2 | 4 | 0 | 4 |
| 2 | 8 | 2 | 3 | 6 | 1 | 5 |
| 3 | 16 | 2 | 4 | 8 | 2 | 6 |
| 4 | 32 | 2 | 5 | 10 | 3 | 7 |
| 5 | 64 | 2 | 6 | 12 | 4 | 8 |
| 6 | 128 | 2 | 7 | 14 | 5 | 9 |
| 7 | 256 | 2 | 8 | 16 | 6 | 10 |
| 8 | 512 | 2 | 9 | 18 | 7 | 11 |
| 9 | 1024 | 2 | 10 | 20 | 8 | 12 |
| 10 | 2048 | 2 | 11 | 22 | 9 | 13 |
| 11 | 4096 | 2 | 12 | 24 | 10 | 14 |
| 12 | 8192 | 2 | 13 | 26 | 11 | 15 |
| 13 | 16384 | 2 | 14 | 28 | 12 | 16 |
| 14 | 32768 | 2 | 15 | 30 | 13 | 17 |
| 15 | 65536 | 2 | 16 | 32 | 14 | 18 |
| 16 | 131072 | 2 | 17 | 34 | 15 | 19 |
| 17 | 262144 | 2 | 18 | 36 | 16 | 20 |
| 18 | 524288 | 2 | 19 | 38 | 17 | 21 |
| 19 | 1048576 | 2 | 20 | 40 | 18 | 22 |
| 20 | 2097152 | 2 | 21 | 42 | 19 | 23 |

From the values of $\Sigma \mathbb{E}(x)$ and $\Sigma \mathbb{E}(y)$, we can now determine the lengths of each row of the Exeleon matrix for a specific random study with known amount of random variables, which can make a first time appearance only $(x)_{nf}$ in a specific study.

Now we have all the elements to structure the Exeleon matrix space area

| Exeleon Matrix Area | | | | | | | | | | | |
|---|---|---|---|---|---|---|---|---|---|---|---|
| $\Sigma Æ(x)$ | $\Sigma Æ(x)\phi^2 - E_k$ | $\Sigma Æ(y)$ | R1 | R2 | R3 | R4 | R5 | R6 | R7 | R8 | R9 |
| 4 | 10 | 4 | 4 | 3 | 2 | 1 | 0 | 0 | 0 | 0 | 0 |
| 8 | 21 | 5 | 8 | 6 | 4 | 2 | 1 | 0 | 0 | 0 | 0 |
| 12 | 32 | 5 | 12 | 9 | 6 | 3 | 1 | 1 | 0 | 0 | 0 |
| 16 | 43 | 6 | 16 | 12 | 8 | 4 | 2 | 1 | 0 | 0 | 0 |
| 20 | 54 | 6 | 20 | 15 | 10 | 5 | 3 | 1 | 0 | 0 | 0 |
| 24 | 65 | 6 | 24 | 18 | 12 | 6 | 3 | 1 | 0 | 0 | 0 |
| 28 | 76 | 6 | 28 | 21 | 14 | 7 | 3 | 2 | 1 | 0 | 0 |
| 32 | 87 | 7 | 32 | 24 | 16 | 8 | 4 | 2 | 1 | 0 | 0 |
| 36 | 98 | 7 | 36 | 27 | 18 | 9 | 5 | 2 | 1 | 0 | 0 |
| 40 | 109 | 7 | 40 | 30 | 20 | 10 | 5 | 2 | 1 | 0 | 0 |
| 44 | 120 | 7 | 44 | 33 | 22 | 11 | 6 | 3 | 1 | 0 | 0 |
| 48 | 131 | 7 | 48 | 36 | 24 | 12 | 6 | 3 | 2 | 0 | 0 |
| 52 | 142 | 7 | 52 | 39 | 26 | 13 | 7 | 3 | 2 | 0 | 0 |
| 56 | 153 | 7 | 56 | 42 | 28 | 14 | 8 | 3 | 2 | 0 | 0 |
| 60 | 164 | 7 | 60 | 45 | 30 | 15 | 8 | 3 | 2 | 1 | 0 |
| 64 | 175 | 8 | 64 | 48 | 32 | 16 | 8 | 4 | 2 | 1 | 0 |
| 68 | 186 | 8 | 68 | 51 | 34 | 17 | 9 | 4 | 2 | 1 | 0 |
| 72 | 197 | 8 | 72 | 54 | 36 | 18 | 9 | 4 | 3 | 1 | 0 |
| 76 | 208 | 8 | 76 | 57 | 38 | 19 | 9 | 5 | 3 | 1 | 0 |
| 80 | 219 | 8 | 80 | 60 | 40 | 20 | 10 | 5 | 3 | 1 | 0 | as functions of the sum total of first time appearance only of random variable elements or coded groups (n) of a random study with (nf) values, $\{1 \leqq (nf) \geqq \infty\}$.

1. The total space area $= \Sigma Æ(x)\phi^2 - E_k$
2. The X-vector length max $= \Sigma Æ(x)$
3. The Y-vector length max $= \Sigma Æ(y)$
4. The X-vector length $\Sigma Æ(x)_{R1} =_{R1}$
5. The X-vector length $\Sigma Æ(x)_{R2} =_{R2}$
6. The X-vector length $\Sigma Æ(x)_{R3} =_{R3}$
7. The X-vector length $\Sigma Æ(x)_{R4} =_{R4}$
8. The X-vector length $\Sigma Æ(x)_{R\infty} =_{R\infty}$ Calculating $\Sigma Æ(x)_{R1} \ldots \Sigma Æ(x)_{R\infty}$ $R1/ = Æ(x) = \Sigma Æ(x)_{R1}$ $R2/ = 0.75(R1) = 0.75 * \Sigma Æ(x)$ $R3/ = 0.5(R1) = 0.667 \Sigma Æ(x)_{R2}$ $R4/ = 0.25(R1) = 0.5 \Sigma Æ(x)_{R3}$ $R5/ = 0.125(R1) = 0.5 \Sigma Æ(x)_{R4}$ R6/max calculated from here to infinity 50% of the previous level of R The Exeleon matrix and methodology of the Exeleon algorithm is a mirror mimicking of the process of randomness in random space and what the scientific world call, "and now nature makes its move" to produce a random event appearance for us to experience in our three dimensional space existence.

Not only are we now looking at the modus operandi of a random process in evolvement, we are also able to display and partially predict the random process of producing a random event occurrence materializing as a three dimensional appearance, using the Exeleon algorithm ($Æ$).

In calculating R1 ... R9, all functions of $\Sigma Æ(x)$ are determinable (see Table).

In the following table R3-R8 are rounded off to the nearest positive integer.

| | Calculating R1 ... R9 | | | | | | | | |
|---|---|---|---|---|---|---|---|---|---|
| $Æ(x)$ | R1 = $\Sigma Æ$ (x) | R2 = R1 * 0.75 | R3 = R1 * 05 | R4 = R1 * 0.25 | R5 = R1 * 0.125 | R6 = R1 * 0.0625 | R7 = R1 * 0.03125 | R8 = R1 * 0.015625 | R9 = R1 * 0.078125 | $\Sigma Æ$ (x) |
| 4 | 4 | 3 | 2 | 1 | 0 | 0 | 0 | 0 | 0 | 10 |
| 8 | 8 | 6 | 4 | 2 | 1 | 0 | 0 | 0 | 0 | 21 |
| 12 | 12 | 9 | 6 | 3 | 1 | 1 | 0 | 0 | 0 | 32 |
| 16 | 16 | 12 | 8 | 4 | 2 | 1 | 0 | 0 | 0 | 43 |
| 20 | 20 | 15 | 10 | 5 | 3 | 1 | 0 | 0 | 0 | 54 |
| 24 | 24 | 18 | 12 | 6 | 3 | 1 | 0 | 0 | 0 | 64 |
| 28 | 28 | 21 | 14 | 7 | 3 | 2 | 1 | 0 | 0 | 76 |
| 32 | 32 | 24 | 16 | 8 | 4 | 2 | 1 | 0 | 0 | 87 |
| 36 | 36 | 27 | 18 | 9 | 5 | 2 | 1 | 0 | 0 | 98 |
| 40 | 40 | 30 | 20 | 10 | 5 | 2 | 1 | 0 | 0 | 108 |
| 44 | 44 | 33 | 22 | 11 | 6 | 3 | 1 | 0 | 0 | 120 |
| 48 | 48 | 36 | 24 | 12 | 6 | 3 | 2 | 0 | 0 | 131 |
| 52 | 52 | 39 | 26 | 13 | 7 | 3 | 2 | 0 | 0 | 142 |
| 56 | 56 | 42 | 28 | 14 | 8 | 3 | 2 | 0 | 0 | 153 |
| 60 | 60 | 45 | 30 | 15 | 8 | 3 | 2 | 1 | 0 | 164 |
| 64 | 64 | 48 | 32 | 16 | 8 | 4 | 2 | 1 | 0 | 175 |
| 68 | 68 | 51 | 34 | 17 | 9 | 4 | 2 | 1 | 0 | 186 |
| 72 | 72 | 54 | 36 | 18 | 9 | 4 | 3 | 1 | 0 | 197 |
| 76 | 76 | 57 | 38 | 19 | 9 | 5 | 3 | 1 | 0 | 208 |
| 80 | 80 | 60 | 40 | 20 | 10 | 5 | 3 | 1 | 0 | 219 |

Exeleon Matrix of Random Exp No. 4(D)

$\Sigma \mathit{I\!E}(x)=6$ Random Variables

Exeleon matrix as a function of the sum total of Ftao-random variables of the Exeleon matrix, $\Sigma \mathit{I\!E}(x)=6$

|  | C1 | C2 | C3 | C4 | C5 | C6 |
|---|---|---|---|---|---|---|
| R1 | ▦ | ▦ | ▦ | ▦ | ▦ | ▦ |
| R2 | ▦ | ▦ | ▦ | ▦ | ▦ | |
| R3 | ▦ | ▦ | ▦ | ▦ | | |
| R4 | ▦ | ▦ | | | | |
| R5 | ▦ | | | | | |

The random experiment no 4 to characterize the profile of a sum total of 6 random variables making their first-time-only-appearances $(x)_{nf}$ in our three dimensional space, requires an apparatus generating such random events for us to analyze.

For this random experiment no 4, we therefore use a selection of unbiased and fair six sided dices at random, each with a maximum of six sides and the side which will end facing upwards, after a good shuffle in a tumbler as it lands on a glass table top and comes unhindered to a stop. Such side will have as a single appearance per through the desired outcome as a random three dimension appearance from random space.

Results from this methodology hereby is used to characterize the $\Sigma \mathit{I\!E}(x)=6$, Exeleon matrix structure. As the amount of random $\Sigma(x)_{nf}$ is equal to $\Sigma \mathit{I\!E}(x)$, we do not need to use data compression in this case and coding for experiment 4D as was used in random experiment no 1 and here the actual numbers appearing will be treated as actual input and introduced in the empty cells of the $\Sigma \mathit{I\!E}(x)=6$, Exeleon matrix sequentially as they appear according to the Exeleon algorithm's required steps.

Results of Random Exp. 4(D)

EXP 4D No. 11

|  | C1 | C2 | C3 | C4 | C5 | C6 |
|---|---|---|---|---|---|---|
| R1 | ΔT1 / No 6 | ΔT2 / No 2 | ΔT3 / No 4 | ΔT4 / No 5 | ΔT5 / No 1 | |
| R2 | ΔT6 / No 2 | ΔT7 / No 4 | ΔT8 / No 6 | ΔT9 / No 1 | | ΔT15 / No 5 |
| R3 | ΔT10 / No 2 | ΔT12 / No 4 | ΔT16 / No 1 | | | |
| R4 | ΔT11 / No 2 | | | | | |
| R5 | ΔT13 / No 2 | | | | | |
| R6 | ΔT14 / No 2 | | | | | |

Experiment 4(D) no 11 is a typical result of a $\Sigma \mathit{I\!E}(x)=6$ Exeleon algorithm conducting according to the above mentioned experimental methodology.

$\{1 \leq \Delta T \geq 16\}$, indicates the sequential three dimensional appearance results obtained with increments of 1, from ΔT1 to ΔT16.

Ten consecutive actual random series results were analysed versus calculation of the Exeleon matrix as a function of $\Sigma \mathit{I\!E}(x)=6$.

EXP NO 4(D)/1    accuracy 93.7%

EXP 4D    1

|  | C1 | C2 | C3 | C4 | C5 | C6 |
|---|---|---|---|---|---|---|
| R1 | 2 | 3 | 1 | 6 | 5 | 4 |
| R2 | 2 | 3 | 6 | 1 | | |
| R3 | 2 | 3 | 6 | 1 | | |
| R4 | 2 | 3 | | | | |
| R5 | | | | | | |

EXP NO 4(D)/2    accuracy 93.7%

EXP 4D    2

|  | C1 | C2 | C3 | C4 | C5 | C6 |
|---|---|---|---|---|---|---|
| R1 | 1 | 2 | 4 | 5 | 3 | 6 |
| R2 | 1 | 2 | 4 | 3 | 6 | |
| R3 | 1 | 2 | 4 | | | |
| R4 | 1 | 4 | | | | |
| R5 | | | | | | |

EXP NO 4(D)/3    accuracy 87.5%

EXP 4D    3

|  | C1 | C2 | C3 | C4 | C5 | C6 |
|---|---|---|---|---|---|---|
| R1 | 3 | 4 | 2 | 6 | 1 | 5 |
| R2 | 3 | 4 | 1 | 6 | 2 | |
| R3 | 3 | 1 | | | | |
| R4 | 3 | | | | | |
| R5 | 3 | | | | | |
| R6 | 3 | | | | | |

EXP NO 4(D)/4    accuracy 87.5%

EXP 4D    4

|  | C1 | C2 | C3 | C4 | C5 | C6 |
|---|---|---|---|---|---|---|
| R1 | 6 | 4 | 3 | 2 | 5 | |
| R2 | 2 | 3 | 6 | | | |
| R3 | 2 | 3 | 6 | | | |
| R4 | 2 | 3 | 6 | | | |
| R5 | 2 | | | | | |

EXP NO 4(D)/5    accuracy 87.5%

EXP 4D    5

|  | C1 | C2 | C3 | C4 | C5 | C6 |
|---|---|---|---|---|---|---|
| R1 | 5 | 6 | 1 | 4 | 2 | |
| R2 | 2 | 6 | 4 | 1 | | |
| R3 | 6 | 1 | 4 | 2 | | |
| R4 | 2 | 1 | 4 | | | |
| R5 | | | | | | |

EXP NO 4(D)/6                accuracy 93.7%

EXP 4D    6

|    | C1 | C2 | C3 | C4 | C5 | C6 |
|----|----|----|----|----|----|----|
| R1 | 1  | 4  | 2  | 3  | 5  | 6  |
| R2 | 4  | 1  | 3  | 6  |    |    |
| R3 | 4  | 3  | 1  | 6  |    |    |
| R4 | 4  |    |    |    |    |    |
| R5 | 4  |    |    |    |    |    |

EXP NO 4(D)/7                accuracy 93.7%

EXP 4D    7

|    | C1 | C2 | C3 | C4 | C5 | C6 |
|----|----|----|----|----|----|----|
| R1 | 4  | 5  | 2  | 6  | 1  |    |
| R2 | 5  | 2  | 4  | 1  | 6  |    |
| R3 | 2  | 1  | 6  |    |    |    |
| R4 | 1  | 2  |    |    |    |    |
| R5 | 1  |    |    |    |    |    |

EXP NO 4(D)/8                accuracy 93.7%

EXP 4D    8

|    | C1 | C2 | C3 | C4 | C5 | C6 |
|----|----|----|----|----|----|----|
| R1 | 2  | 4  | 5  | 1  | 3  |    |
| R2 | 2  | 1  | 4  | 3  |    |    |
| R3 | 1  | 4  | 2  |    |    |    |
| R4 | 1  | 4  |    |    |    |    |
| R5 | 1  |    |    |    |    |    |

EXP NO 4(D)/8                accuracy 93.7%

EXP 4D    9

|    | C1 | C2 | C3 | C4 | C5 | C6 |
|----|----|----|----|----|----|----|
| R1 | 5  | 1  | 3  | 6  | 4  |    |
| R2 | 5  | 1  | 6  | 3  |    |    |
| R3 | 5  | 1  | 6  |    |    |    |
| R4 | 5  | 6  |    |    |    |    |
| R5 | 5  |    |    |    |    |    |
| R6 |    |    |    |    |    |    |

EXP NO 4(D)/10               accuracy 87.5%

EXP 4D    10

|    | C1 | C2 | C3 | C4 | C5 | C6 |
|----|----|----|----|----|----|----|
| R1 | 6  | 4  | 2  | 1  | 5  |    |
| R2 | 6  | 4  | 1  | 5  |    |    |
| R3 | 6  | 4  | 1  |    |    |    |
| R4 | 6  | 4  |    |    |    |    |
| R5 |    |    |    |    |    |    |

In calculating the parameters of the Exeleon matrix as a function of a sum total of $6(x)_{nf}$-random variables we get the following results.

$\Sigma \mathcal{E}(x) = 6$

The total space area $= \tau \mathcal{E}(x)\phi^2 - E_k = 16$
The X-vector length max $= \tau \mathcal{E}(x) = 6$
The Y-vector length max $= \tau \mathcal{E}(y) = 5$
The X-vector length R1=6
The X-vector length R2=4
The X-vector length R3=3
The X-vector length R4=2
The X-vector length R5=1

| Frequency of three dimensional random appearances of $\mathcal{E}(x_{i,j})$ from C1 to C6. | | | | | | |
|---|---|---|---|---|---|---|
| Exp 4(D) | C1 | C2 | C3 | C4 | C5 | C6 |
| 1 | 4 | 4 | 3 | 3 | 1 | 1 |
| 2 | 4 | 4 | 3 | 2 | 2 | 1 |
| 3 | 6 | 3 | 2 | 2 | 2 | 1 |
| 4 | 6 | 4 | 4 | 1 | 1 | 0 |
| 5 | 6 | 4 | 4 | 1 | 1 | 0 |
| 6 | 5 | 3 | 3 | 3 | 1 | 1 |
| 7 | 5 | 4 | 3 | 2 | 2 | 0 |
| 8 | 5 | 4 | 3 | 3 | 1 | 0 |
| 9 | 6 | 4 | 3 | 2 | 1 | 0 |
| 10 | 4 | 4 | 3 | 2 | 2 | 0 |
| Σ frequencies | 94 | 68 | 56 | 37 | 25 | 6 |
| Experimental mean | 5.1 | 3.8 | 3.1 | 2.1 | 1.4 | 0.4 |
| Exeleon matrix | 5 | 4 | 3 | 2 | 1 | 1 |

Figure 2:
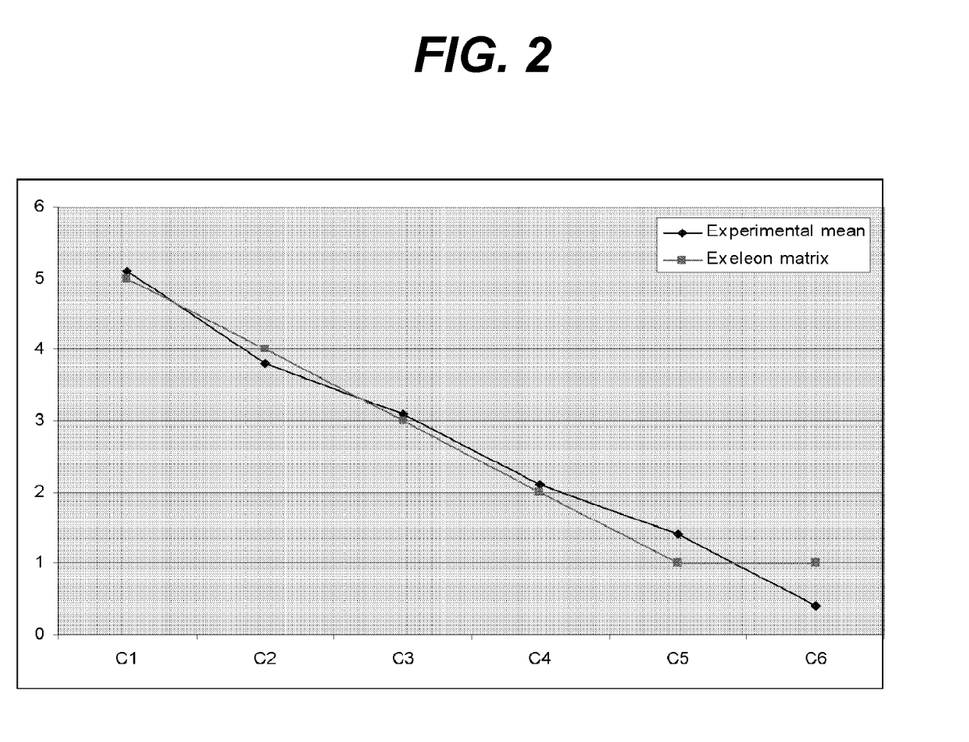
FIGS. 2 through 5 each show a graph, according to the present invention.

The difference of the calculated values for the Exeleon matrix structure, versus the average of ten real time random experimental results as per random experiment no 4 (D) is shown in graph form in FIG. 2.

| Total numbers | No | freq | % |
|---|---|---|---|
| Highest frequency numbers | | | |
| 20 | 1 | 5 | 25 |
| 20 | 2 | 4 | 20 |
| 20 | 3 | 4 | 20 |
| 20 | 4 | 4 | 20 |
| 20 | 5 | 1 | 5 |
| 20 | 6 | 2 | 10 |
| Lowest frequency numbers | | | |
| 20 | 1 | 1 | 5 |
| 20 | 2 | 3 | 15 |
| 20 | 3 | 3 | 15 |
| 20 | 4 | 3 | 15 |
| 20 | 5 | 8 | 40 |
| 20 | 6 | 2 | 10 |

Figure 3:
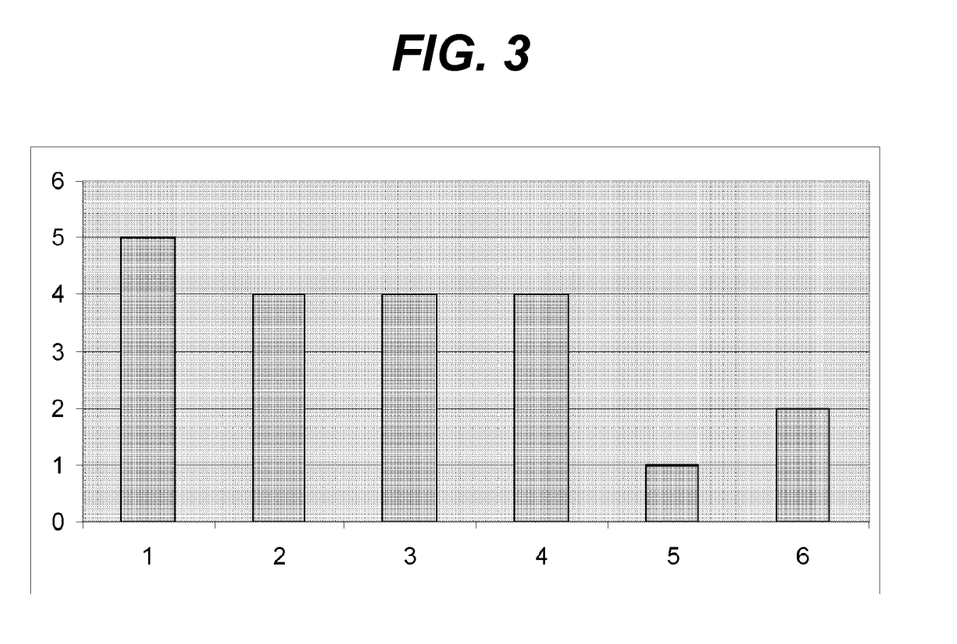

Graphical display of random numbers of Exp 4(D), which had the highest frequency of three dimensional appearances, (no. 1 the highest and no. 5 the lowest) is shown in FIG. 3.

Figure 4:
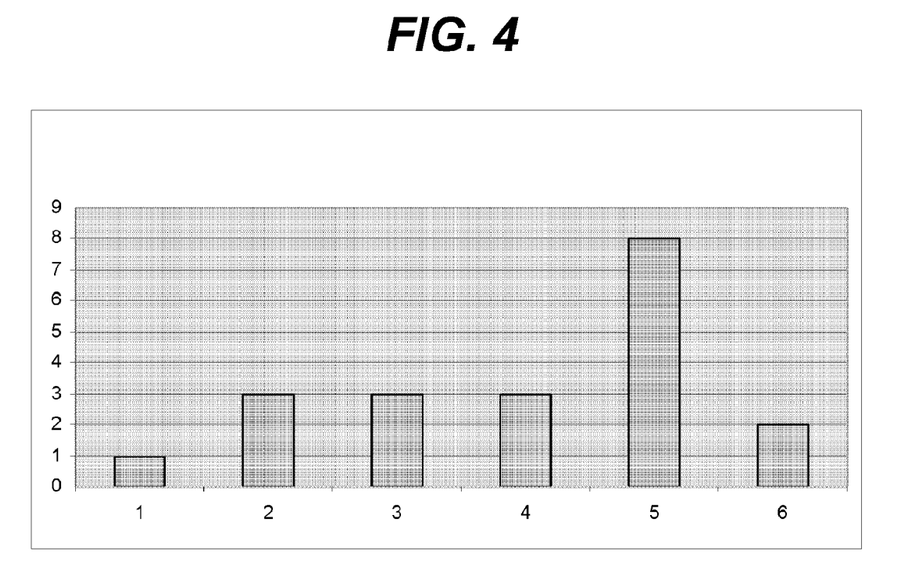

Graphical display of random numbers of Exp 4(D), which had the lowest frequency of three dimensional appearances, number five the highest and number one the lowest is shown in FIG. 4.

If we were to analyse the two numbers of highest frequency of three dimensional appearances per random series, we will see that after each random event series, $\{1 \leq \Delta T \geq 16\}$, there is a random change in the top order of numbers, per series.

| Exp 4(D) | Numbers as highest frequency pair per random series. | |
|---|---|---|
| Series 1 | 2 | 3 |
| Series 2 | 1 | 4 |
| Series 3 | 3 | 1 |
| Series 4 | 2 | 3 |
| Series 5 | 2 | 1 |
| Series 6 | 4 | 3 |
| Series 7 | 1 | 2 |

-continued

| Exp 4(D) | Numbers as highest frequency pair per random series. | |
|---|---|---|
| Series 8 | 1 | 4 |
| Series 9 | 5 | 6 |
| Series 10 | 6 | 4 |

Exeleon Matrix of Random Exp No. 5

$\Sigma \!E\!(x)=4$ Random Variables

Exeleon function of the random $\Sigma AE(x) = 4$ — matrix as a sum total of variables, R1, R2, R3, R4 across C1, C2, C3, C4.

The random experiment no 5 to characterize the profile of a sum total of 4 random variables making their first-time-only-appearances $(x)_{nf}$ in our three dimensional space requires an apparatus generating such random events for us to analyze.

For this random experiment no 5, we use a selection of unbiased and fair deck of 52 playing cards (without the joker cards) and we analyze the frequency of three dimensional appearances of the suites of harts, diamonds, spades and clubs as 4 random variables dispersed randomly within a deck of 52 which is shuffled well. After each card is drawn at randomly the pack is cut at randomly before the next card is taken from the top of the deck of cards. Such cards will have as a single appearance per random cut the top card as the desired outcome representing a single random three dimension appearance from random space.

In calculating the parameters of the Exeleon matrix as a function of a sum total of 4 random variables we get the following results.

$\Sigma \!E\!(x)=4$

The total space area $=\Sigma \!E\!(x)\phi^2 - E_k = 10$

The X-vector length max $=\Sigma \!E\!(x)=4$

The Y-vector length max $=\Sigma \!E\!(y)=4$

The X-vector length R1=4

The X-vector length R2=3

The X-vector length R3=2

The X-vector length R4=1 function random R1, R2, R3, R4 across C1, C2, C3, C4 — Exeleon matrix as of the sum total of variables, $\Sigma AE(x) = 4$.

Results of Random Exp. 5

EXP 5 No. 11

| | C1 | C2 | C3 | C4 |
|---|---|---|---|---|
| R1 | ΔT1 | ΔT2 | ΔT3 | ΔT5 |
| R2 | ΔT4 | ΔT6 | ΔT8 | |
| R3 | ΔT7 | ΔT9 | | |
| R4 | ΔT10 | | | |

Experiment 5 no 11 is a typical result of a $\Sigma \!E\!(x)=4$ Exeleon algorithm conducting according to the above mentioned experimental methodology.

$\{1 \leq \Delta T \leq 10\}$, indicates the sequential three dimensional appearance results obtained with increments of one, from ΔT1 to ΔT16.

Above experiment, No 5 (11) is an example of an Exeleon matrix which filled up with a 100% accuracy.

Ten consecutive actual random series results were analysed versus calculation of the Exeleon matrix as a function of $\Sigma \!E\!(x)=4$.

EXP NO 5/1    accuracy 90%
EXP 5    1

| | C1 | C2 | C3 | C4 |
|---|---|---|---|---|
| R1 | D | C | S | H |
| R2 | C | S | D | |
| R3 | H | C | | |
| R4 | | | | |

EXP NO 5/2    accuracy 90%
EXP 5    2

| | C1 | C2 | C3 | C4 |
|---|---|---|---|---|
| R1 | D | H | C | S |
| R2 | C | H | S | |
| R3 | C | H | | |
| R4 | | | | |

EXP NO 5/3    accuracy 90%
EXP 5    3

| | C1 | C2 | C3 | C4 |
|---|---|---|---|---|
| R1 | D | C | H | S |
| R2 | D | H | | |
| R3 | D | H | | |
| R4 | D | | | |
| R5 | | | | |

EXP NO 5/4            accuracy 100%
EXP 5     4
          C1  C2  C3  C4
R1       | D | S | C | H |
R2       | C | S | D |
R3       | S | C |
R4       | S |

EXP NO 5/5            accuracy 100%
EXP 5     5
          C1  C2  C3  C4
R1       | C | S | H | D |
R2       | S | C | D |
R3       | S | C |
R4       | S |

EXP NO 5/6            accuracy 100%
EXP 5     6
          C1  C2  C3  C4
R1       | S | C | H | D |
R2       | S | D | C |
R3       | S | D |
R4       | S |

EXP NO 5/7            accuracy 90%
EXP 5     7
          C1  C2  C3  C4
R1       | S | H | C | D |
R2       | S | H | D | ▓ |
R3       | S | ▓ |
R4       | S |

EXP NO 5/8            accuracy 90%
EXP 5     8
          C1  C2  C3  C4
R1       | H | D | C | S |
R2       | H | D | ▓ |
R3       | D | H |
R4       | D | ▓ |

EXP NO 5/9            accuracy 90%
EXP 5     9
          C1  C2  C3  C4
R1       | D | C | S | H |
R2       | D | H | ▓ |
R3       | D | H |
R4       | D |
R5       | ▓ |

EXP NO 5/10           accuracy 90%
EXP 5     10
          C1  C2  C3  C4
R1       | H | C | S | D |
R2       | C | H | S | ▓ |
R3       | C | ▓ |
R4       | C |

| Frequency of three dimensional random appearances of $Æ(x_{i,j})$ from C1 to C4. | | | | |
|---|---|---|---|---|
| Exp 5 | C1 | C2 | C3 | C4 |
| 1 | 3 | 3 | 2 | 2 |
| 2 | 3 | 3 | 2 | 2 |
| 3 | 5 | 3 | 1 | 1 |
| 4 | 4 | 3 | 2 | 1 |
| 5 | 4 | 3 | 2 | 1 |
| 6 | 4 | 3 | 2 | 1 |
| 7 | 4 | 2 | 2 | 2 |
| 8 | 4 | 4 | 1 | 1 |
| 9 | 5 | 3 | 1 | 1 |
| 10 | 4 | 2 | 2 | 2 |
| Σ frequencies | 40 | 29 | 17 | 14 |
| Experimental mean | 4 | 2.9 | 1.7 | 1.4 |
| Exeleon matrix | 4 | 3 | 2 | 1 |

Figure 5:
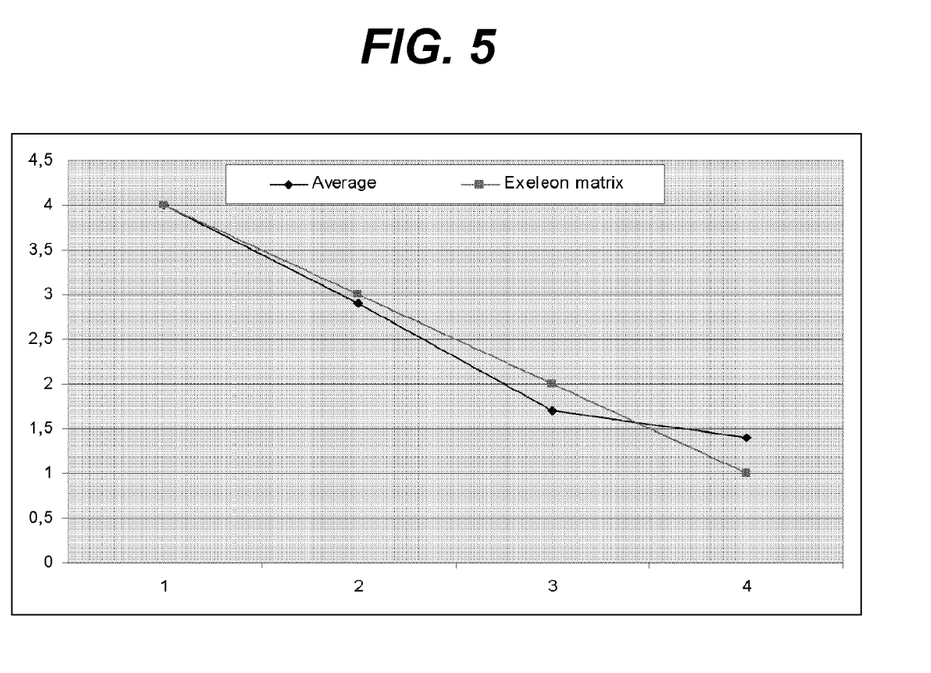

The difference of the calculated values for the Exeleon matrix structure as function of the sum total amount of $\Sigma Æ(x)=4$ random variables of random experiment no 5 versus the average of ten real time random experimental results are shown in FIG. 5.

Figure 1:
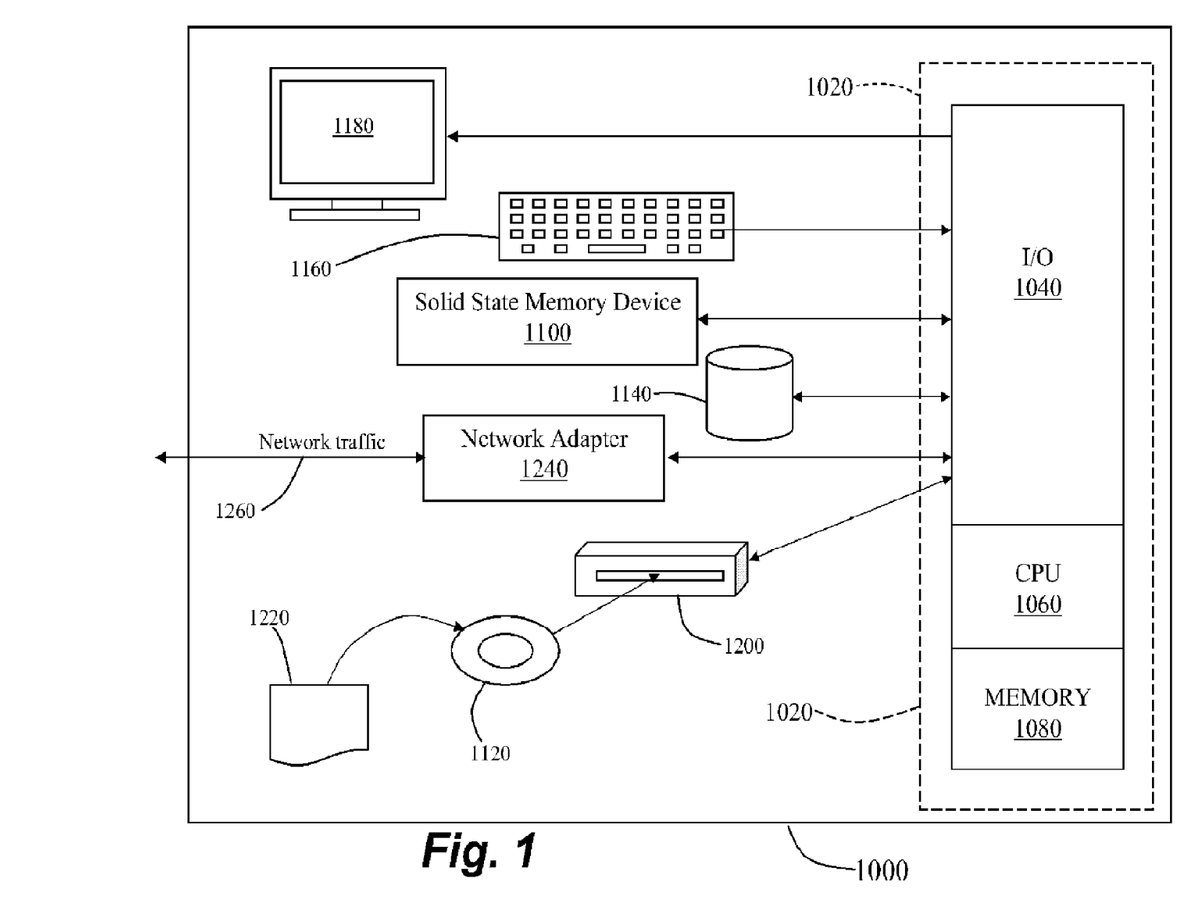
FIG. 1 shows an example of a computing system capable of executing the embodiments of the present invention, according to the present invention.

FIG. 1 depicts an example of a computing system 1000 capable of executing the embodiments of the present invention. In such a system, data and program files may be input to the computing system 1000, which reads the files and executes the programs therein. A control module, illustrated as a processor 1020, is shown having an input/output (I/O) section 1040, at least one microprocessor, or at least one Central Processing Unit (CPU) represented in FIG. 1 by a CPU 1060, and a memory section 1080. The present invention is optionally implemented in software or firmware modules loaded in memory 1080 and/or stored on a solid state, non-volatile memory device 1100, a configured ROM disk such as a configured CD/DVD ROM 1120 or a disk storage unit 1140. The computing system 1000 can be used as a "special-purpose" machine for implementing the present invention.

The I/O section 1040 is connected to a user input module 1160, e.g., a keyboard; an output unit, e.g., a display unit 1180 for displaying Exeleon matrices of the present invention, and one or more program storage devices, such as, without limitation, the solid state, non-volatile memory device 1100, the disk storage unit 1140, and a disk drive unit 1200. The user input module 1160 is shown as a keyboard, but may also be any other type of apparatus for inputting commands into the processor 1020. The solid state, non-volatile memory device 1100 can be an embedded memory device for storing instructions and commands in a form readable by the CPU 1060.

The solid state, non-volatile memory device 1100 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. The disk drive unit 1200 is a CD/DVD-ROM driver unit capable of reading the CD/DVD-ROM medium 1120, which typically contains programs 1220 and data. The program components of the present invention contain the logic steps to effectuate the systems and methods in accordance with the present invention and may reside in the memory section 1080, the solid state, non-volatile memory device 1100, the disk storage unit 1140 or the CD/DVD-ROM medium 1120.

In accordance with an alternative embodiment, the disk drive unit 1200 may be replaced or supplemented by a floppy drive unit, a tape drive unit, or other storage medium drive unit.

A network adapter 1240 is capable of connecting the computing system 1000 to one or more computer systems based in the United States or further afield abroad or a remote via a network link 1260 and thence via, for example, the Internet or a dedicated communication line. Communication between the computing system 1000 and other computer locations can be achieved using hypertext transfer protocol HTTP or HTTPS over a secure socket layer. The network adapter 1240 can be configured to receive and send messages wirelessly or to send/receive messages via a hard line such as a fibre optic cable (e.g., in operation with a cable company such as, but not limited to, COMCAST, COX, or a private network).

Software instructions to perform the present invention can be stored on the solid state, non-volatile memory device 1100, the disk storage unit 1220, or the CD/DVD-ROM 1120 are executed by the at least one CPU represented in FIG. 1 by CPU 1060. Data may be stored in memory section 1080, or on the solid state, non-volatile memory device 1100, the CD/DVD-ROM 1120, the disk storage unit 1220, the disk drive unit 1200 or other storage medium units operatively coupled to the system 1000.

In accordance with one embodiment, the computing system 1000 further comprises an operating system and usually one or more application programs. The operating system comprises a set of programs that control operations of the computing system 1000 and allocation of resources. The set of programs, inclusive of certain utility programs, may also provide a graphical user interface to the user. An application program is software that runs on top of the operating system software and uses computer resources made available through the operating system to perform application specific tasks desired by the user. In accordance with an embodiment, the operating system employs a graphical user interface wherein the display output of an application program is presented in a rectangular area on the screen of the display device 1180. The operating system can be any suitable operating system, and may be any of the following: Microsoft Corporation's "WINDOWS 95," "WINDOWS CE," "WINDOWS 98," "WINDOWS 2000", "WINDOWS NT", XP, VISTA or "WINDOWS 7" operating systems, IBM's OS/2 WARP, Apple's MACINTOSH SYSTEM 8 operating system, ULTRIX, VAX/VMS, UNIX or LINUX with the X-windows graphical environment, and any suitable operating system under development such as Microsoft's future replacement of the "Window 7" operating system.

It is to be understood that the present invention is not limited to the embodiments described above, but encompasses any and all embodiments within the scope of the spirit of the present invention.

I claim:

1. A method for detecting trends based on outcomes generated by a first process, comprising the steps of:
    (a) determining by a processor all possible outcomes associated with the first process, wherein the first process is associated with a range of possible outcomes;
    (b) coding by a processor the possible outcomes to provide a plurality of separate groups, wherein each possible outcome is systematically allocated to one of the groups;
    (c) allocating by a processor an identifier to each of the groups;
    (d) monitoring by a processor in real time the first process such that actual outcomes generated by the first process are mapped to an identifier in accordance with coding step (b);
    (e) providing by a processor a matrix comprised of a plurality of cells arranged in rows and columns;
    (f) allocating by a processor each identifier generated in step (d) to the matrix; and
    (g) repeating step (f) by a processor until a trend of duplicating identifiers becomes self-evident,
    wherein steps (a) through (g) are encoded into a computer software programmable language and run on a processor,
    wherein each identifier is allocated to the first row from left to right, and upon first duplication of identifier allocating the identifier to the 2nd row from left to right, and upon second duplication of the identifier allocating the identifier to the 3rd row from left to right, and upon third duplication of identifier allocating the identifier to the 4th row from left to right, and upon fourth duplication of identifier allocating the identifier to the 5th row and so on,
    wherein the number of columns in the matrix are sufficient to accommodate the number of identifiers of step (c), and
    wherein the number of rows in the matrix are sufficient to accommodate the number of duplications occurring in the first process.

* * * * *